US012781071B2

(12) United States Patent
Kobayashi et al.

(10) Patent No.: US 12,781,071 B2
(45) Date of Patent: Nov. 3, 2026

(54) DISPERSANT, DISPERSION, INK COMPOSITION, AND METHOD FOR PRODUCING SAME

(71) Applicant: Nissin Chemical Industry Co., Ltd., Echizen (JP)

(72) Inventors: Fumika Kobayashi, Echizen (JP); Seigo Kawabata, Echizen (JP); Tomoyuki Nishikawa, Echizen (JP)

(73) Assignee: NISSIN CHEMICAL INDUSTRY CO., LTD., Echizen (JP)

( * ) Notice: Subject to any disclaimer, the term of this patent is extended or adjusted under 35 U.S.C. 154(b) by 477 days.

(21) Appl. No.: 18/368,227

(22) Filed: Sep. 14, 2023

(65) Prior Publication Data

US 2024/0124730 A1 Apr. 18, 2024

(30) Foreign Application Priority Data

Sep. 29, 2022 (JP) ................................. 2022-155738

(51) Int. Cl.

*C08J 3/03* (2006.01)
*C08F 212/08* (2006.01)
*C08F 220/06* (2006.01)
*C08F 220/14* (2006.01)
*C09D 11/107* (2014.01)
*C09D 11/322* (2014.01)

(52) U.S. Cl.

CPC .......... *C09D 11/322* (2013.01); *C08F 212/08* (2013.01); *C08F 220/06* (2013.01); *C08F 220/14* (2013.01); *C09D 11/107* (2013.01)

(58) Field of Classification Search

CPC ........ C08J 3/03; C09D 11/322; C09D 11/107; C08F 212/08; C08F 220/06; C08F 220/14
USPC .......................................................... 524/561
See application file for complete search history.

(56) References Cited

U.S. PATENT DOCUMENTS 7,758,684 B2 * 7/2010 Mizusaki ............... C09D 11/38 106/31.89
11,542,403 B2 * 1/2023 Nishikawa ............ C09B 67/009
2002/0075369 A1 6/2002 Ota et al.
2007/0283845 A1 * 12/2007 Mizusaki ............... C09D 11/38 106/31.89
2015/0116419 A1 4/2015 Oura et al.
2020/0071555 A1 * 3/2020 Nishikawa ............ C09B 67/009
2020/0216580 A1 7/2020 Nakanishi

FOREIGN PATENT DOCUMENTS

EP 3617282 B1 * 12/2023 ............ C09D 11/03
JP 2000-290578 A 10/2000
JP 2002-20673 A 1/2002
JP 2007-131817 A 5/2007
JP 2011-157450 A 8/2011
JP 2014-136777 A 7/2014
JP 2019-14879 A 1/2019
JP 2019-210389 A 12/2019
JP 2022-52994 A 4/2022
WO 2013/008691 A1 1/2013
WO 2014/129323 A1 8/2014

OTHER PUBLICATIONS

Office Action dated Apr. 21, 2026, issued in counterpart JP Application No. 2023-142040, with English translation. (12 pages).

* cited by examiner

*Primary Examiner* — Deve V Hall

(74) *Attorney, Agent, or Firm* — WHDA, LLP

(57) ABSTRACT

The purpose of the present invention is to provide a dispersant which allows disperse dyes and pigments to be dispersed even in a small addition amount, and can exhibit wettability, a dispersion which can exhibit redispersibility, an ink composition including the foregoing, and a method for producing the foregoing. The present invention provides a dispersant containing 50 to 99 wt % of (A) a styrene-ethyleneoxy group-containing (meth)acrylic acid-based copolymer having a weight average molecular weight of 1,000 to 50,000, the copolymer having a styrene content of 1 to 40 wt %, and (B) 1 to 50 wt % of an acetylene-based surfactant which is acetylene glycol or an ethoxylated substance of acetylene glycol having a specific chemical formula, a dispersion, an ink composition, and a method for producing the foregoing.

9 Claims, No Drawings

DISPERSANT, DISPERSION, INK COMPOSITION, AND METHOD FOR PRODUCING SAME

CROSS-REFERENCE TO RELATED APPLICATIONS

This non-provisional application claims priority under 35 U.S.C. § 119(a) on Patent Application No. 2022-155738 filed in Japan on Sep. 29 2022, the entire contents of which are hereby incorporated by reference.

TECHNICAL FIELD

The present invention relates to a dispersant for use in dispersing disperse dyes and pigments, a dispersion, an ink composition, and a method for producing the foregoing.

BACKGROUND ART

Disperse dyes and pigments have been heretofore use as coloring agents for ink. When disperse dyes or pigments are used in ink, it is necessary that disperse dyes and pigments in microparticulate form be dispersed in water. However, since disperse dyes and pigments are insoluble in water, it is important to maintain the disperse dyes and pigments in a dispersed state stably for a long period of time.

Further, ink containing coloring agents insoluble in water like disperse dyes and pigments has the shortcoming that if the ink falls into a dry state by losing its water content for some reasons, aggregation of pigments occurs as the dispersed state of pigments is no longer maintained. Once aggregated as described above, disperse dyes and pigments in the ink cannot be returned to a dispersed state again even by adding a liquid medium such as water (poor redispersibility), and improvement of this problem is strongly desired.

As the dispersant for ink, nonionic, anionic and polymeric surfactants and the like have been proposed. For example, Patent Documents 1 and 2 disclose that nonionic surfactants containing an acetylene group are useful as the pigment dispersant. Although nonionic surfactants containing an acetylene group are excellent in ink penetrability and antifoaming, they are inferior in dispersibility, for example, they take a longer time for dispersion, as compared to other dispersants. Also, they cannot be expected to exhibit a redispersing effect.

As a method for easily redispersing pigments, for example, Patent Document 3 proposes a method in which the surfaces of pigment particles are covered with a silane coupling agent or a specific dispersant to suppress direct contact and strong aggregation and adhesion between the pigments.

Further, Patent Documents 4 and 5 disclose that pigment dispersions including an acryl-based polymer enhance the redispersibility of ink, but they require complicated processes, such as crosslinking a polymer in an aqueous pigment dispersion liquid and performing living radical polymerization. Therefore, it is desirable to develop a dispersant that can be expected to exhibit a redispersing effect with further ease.

Further, Patent Document 6 discloses a dispersing resin which has a hydrophobic monomer, an acryl-based monomer, and a hydrophilic vinyl monomer having a sulfonic acid group, but it may be impossible to exhibit a dispersing effect in aqueous ink because the proportion of the hydrophobic monomer is high.

Patent Document 7 discloses that inkjet ink including a styrene-(meth)acrylic acid-based copolymer and a specific acetylene glycol-based compound in combination has high quality and stable recording performance, and can increase the density of printing on a surface of a fabric while maintaining ink storage stability. However, redispersibility after drying is not explicitly shown.

CITATION LIST

Patent Document 1: JP-A 2000-290578

Patent Document 2: JP-A 2002-020673

Patent Document 3: WO 2013/008691

Patent Document 4: JP-A 2019-210389

Patent Document 5: JP-A 2019-014879

Patent Document 6: JP-A 2022-052994

Patent Document 7: WO 2014/129323

SUMMARY OF THE INVENTION

The present invention has been made in view of the above-described circumstances, and it is an object of the present invention to provide a dispersant which allows disperse dyes and pigments to be dispersed even in a small addition amount, and can exhibit wettability, a dispersion which can exhibit redispersibility, an ink composition including the foregoing, and a method for producing the foregoing.

The present inventors have extensively conducted studies for achieving the above-described object, and resultantly found that a dispersant including a styrene-ethyleneoxy group-containing (meth)acrylic acid-based copolymer and an acetylene-based surfactant in combination is used, dispersibility and wettability are exhibited in a small addition amount, microparticulation of disperse dyes and pigments is improved, and redispersibility can be exhibited. The present invention is based on this finding.

Accordingly, the present invention provides the following dispersant, dispersion and ink composition, and a method for producing the foregoing.

1. A dispersant comprising the components (A) and (B):

(A) 50 to 99 wt % of a styrene-ethyleneoxy group-containing (meth)acrylic acid-based copolymer having a weight average molecular weight of 1,000 to 50,000, the copolymer having a (a1) styrene content of 1 to 40 wt %; and (B) 1 to 50 wt % of an acetylene-based surfactant which is at least one compound selected from acetylene glycol having the formula (1):

(1)

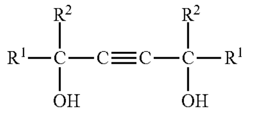

wherein $R^1$ represents an alkyl group having 3 to 5 carbon atoms, and $R^2$ represents an alkyl group having 1 to 5 carbon atoms, and an ethoxylated substance of acetylene glycol having the following formula (2):

(2)

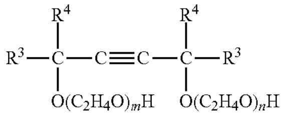

wherein $R^3$ and $R^4$ each represent an alkyl group having 1 to 5 carbon atoms, each of m and n is a positive number of 0.5 to 25, and m+n is 1 to 40.

2. The dispersant of 1, wherein the component (A) is a polymer of:

(a1) 1 to 40 wt % of styrene;

(a2) 1 to 59 wt % of an ethyleneoxy group-containing (meth)acrylic acid alkyl ester monomer: and (a3) 1 to 98 wt % of a monomer other than (a1) and (a2).

3. The dispersant of 2, wherein the monomer as component (a3) contains a radically polymerizable monomer having at least one functional group.

4. The dispersant of 1, comprising only the components (A) and (B).

5. The dispersant of 1, which is used for dispersing a disperse dye or a pigment in an aqueous solvent.

6. A dispersion comprising a dispersant, a disperse dye and/or pigment, and an aqueous solvent, wherein the dispersant is the dispersant of 1.

7. An ink composition comprising the dispersion of 6.

8. A method for producing a dispersion, comprising the step of mixing and dispersing the dispersant of 1, a disperse dye and/or pigment, and an aqueous solvent.

9. A method for producing an ink composition, comprising the steps (a) and (b):

(a) mixing and dispersing the dispersant of 1, a disperse dye and/or pigment, and an aqueous solvent to obtain a dispersion; and (b) mixing the dispersion with at least one substance selected from the group consisting of water, a water-soluble organic solvent, a resin, an ultraviolet absorber, an antioxidant, a pH adjuster, an antiseptic agent, and a viscosity modifier.

Advantageous Effects of the Invention

The dispersant of the present invention allows a disperse dye or a pigment to be dispersed independent of the type of disperse dye or pigment and in a small added amount. The dispersion and ink composition including the dispersant exhibit wettability and dispersion stability, and can exhibit redispersibility.

DETAILED DESCRIPTION OF THE INVENTION

A dispersant of the present invention contains (A) a styrene-ethyleneoxy group-containing (meth)acrylic acid-based copolymer having a weight average molecular weight of 1,000 to 50,000 (hereinafter, referred to as component (A), and at least one compound selected from acetylene glycol and an ethoxylated substance of acetylene glycol (hereinafter, referred to as component (B)).

The styrene-ethyleneoxy group-containing (meth)acrylic acid-based copolymer having a weight average molecular weight of 1,000 to 50,000 as component (A) is preferably a polymer of:

(a1) 1 to 40 wt % of styrene;

(a2) 1 to 59 wt % of an ethyleneoxy group-containing (meth)acrylic acid alkyl ester monomer; and (a3) 1 to 98 wt % of a monomer other than (a1) and (a2).

Component (A) may be a random copolymer or a block copolymer.

The content of the styrene as component (a1) is 1 to 40 wt %, preferably 10 to 30 wt %, per 100 wt % of the monomers of as components (a1) to (a3). When this content is within the range of 1 to 40 wt %, an effect of imparting redispersibility to the dispersion is obtained.

In the ethyleneoxy group-containing (meth)acrylic acid alkyl ester monomer as component (a2), the number of moles of ethyleneoxy group added is preferably 1 to 100, more preferably 5 to 90, still more preferably 10 to 90.

The weight average molecular weight of the ethyleneoxy group-containing (meth)acrylic acid alkyl ester monomer as component (a2) is preferably 100 to 5,000.

Specific examples of the component (a2) include acrylic acid alkyl ester monomers modified with polyethylene glycol. Specific examples thereof include polyethylene glycol mono(meth)acrylate, methoxy polyethylene glycol mono (meth)acrylate, ethoxy polyethylene glycol mono(meth) acrylate, 2-isocyanatoethyl (meth)acrylate modified with polyethylene glycol, and polyethylene glycol-propylene glycol-mono (meth)acrylate. Polyethylene glycol mono(meth) acrylate is particularly preferable.

The polyethylene glycol mono(meth)acrylate has the formula.

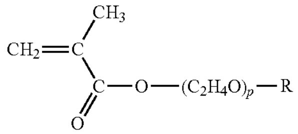

(In the formula, R represents a hydrogen atom, or an alkyl group having 1 to 20 carbon atoms, and p represents a positive number of 1 to 100.)

Examples of the commercially available product of the component (42) include BLEMMERs "PME-400", "PME-1000", "PME-4000", "PE-200", "PE-350", "AE-200", "AE-400" and "AME-400" manufactured by NOF CORPORATION; LIGHT ESTERs "130 MA" and "041 MA" and LIGHT ACRYLATEs "MTG-A" and "130 A" manufactured by KYOEISHA CHEMICAL Co., LTD.; FANCRYL "FA-400 M(100)" manufactured by Showa Denko Materials Co., Ltd.; NK ESTERs "AM-90 G", "AM-130 G", "AM-230 G", "M-90 G", "M-130 G", "M-230 G" and "M-450 G" manufactured by SHIN-NAKAMURA, CHEMICAL CO, LTD.; and VISIOMERs "MPEG 750 MA W", "MPEG 1005 MA W", "MPEG 2005 MA W" and "MPEG 5005 MA W" manufactured by Evonik Industries AG.

The content of the ethyleneoxy group-containing (meth) acrylic acid alkyl ester monomer as component (a2) is 1 to 59 wt %, preferably 5 to 55 wt %, per 100 wt % of monomers (a1) to (a3). When the content of component (a2) is within the range of 1 to 59 wt %, an effect of imparting dispersibility to the disperse de or pigment is obtained by use as a dispersant.

The monomer other than (a1) and (a2) as component (a3) is not particularly limited, and examples thereof include (meth)acrylic acid alkyl ester monomers and/or radically polymerizable monomers containing a functional group such as a carboxy group, an amide group, a hydroxy group, an epoxy group or a sulfonic acid group. They can be used alone or in combination of two or more thereof, and it is preferable that at least one of radically polymerizable monomers containing a functional group such as a carboxy group, an amide group, a hydroxy group, an epoxy group or a sulfonic acid group is contained. (Meth)acrylic acid alkyl ester monomers and/or carboxy group-containing radically polymerizable monomers and hydroxy group-containing radically polymerizable monomers are particularly preferable.

The (meth)acrylic acid alkyl ester monomer is not particularly limited, and examples thereof include those having a linear or branched structure, those having an alicyclic group and those having an aromatic ring group, with the exclusion of the ethyleneoxy group-containing (meth) acrylic acid alkyl ester monomer as component (a2).

Examples of the (meth)acrylic acid alkyl ester mourner having a linear or branched structure include methyl (meth) acrylate, ethyl (meth)acrylate, n-butyl (meth)acrylate, isobutyl (meth)acrylate, sec-butyl (meth)acrylate, tert-butyl (meth)acrylate, 2-ethylhexyl (meth)acrylate, lauryl (meth) acrylate, and stearyl (meth)acrylate.

Examples of the (meth)acrylic acid ester monomer having an alicyclic group include cyclohexyl (meth)acrylate, isobornyl (meth)acrylate, adamantyl (meth)acrylate, and dicyclopentanyl (meth)acrylate.

Examples of the (meth)acrylic acid ester monomer having an aromatic ring group include benzyl (meth)acrylate and phenoxyethyl (meth)acrylate.

Examples of the carboxy group-containing radically polymerizable monomer include methacrylic acid, acrylic acid, carboxyethyl (meth)acrylate, fumaric acid, itaconic acid, maleic acid, crotonic acid, vinylbenzoic acid, maleic acid monobutyl ester, itaconic acid monomethyl ester, and itaconic acid butyl ester.

Examples of the amide group-containing radically polymerizable monomer include N-methoxymethylacrylamide, N-ethoxymethylacrylamide, and N-butoxymethylacrylamide.

Examples of the hydroxy group-containing radically polymerizable monomer include 2-hydroxyethyl (meth) acrylate, 2-hydroxypropyl (meth)acrylate, 3-hydroxypropyl (meth)acrylate, 4-hydroxybutyl (meth)acrylate, 1-methyl-4-hydroxybutyl (meth)acrylate, and 1-methyl-4-hydroxypentyl (meth)acrylate.

Examples of the epoxy group-containing radically polymerizable monomer include glycidyl (meth)acrylate and methacrylic glycidyl ether.

Examples of the sulfonic acid group-containing radically polymerizable monomer include sodium p-styrenesulfonate, lithium p-styrenesulfonate, N-t-butylacrylamidesulfonic acid, sodium 2-sulfoethylmethacrylate, polycyclic phenyl ether methacrylate sulfuric acid ester salts, sodium N-sulfonic acid polyoxyalkylene methacrylates, and ammonium polyoxyalkylene alkenyl ether sulfonates.

Examples of the commercially available product of the sulfonic acid group-containing radically polymerizable monomer include SPINOMAR "NaSS" (sodium p-styrenesulfonate) and "LiSS" (lithium p-styrenesulfonate) manufactured by Tosoh Finechem Corporation, "ATBS" (N-t-butylacrylamidesulfonic acid) manufactured by Toagosei Co., Ltd., Antox "MS-2N-D" (sodium 2-sulfoethylmethacrylate) and "MS-60" (polycyclic phenyl ether methacrylate sulfuric acid ester salt) manufactured by Nippon Nyukazai Co., Ltd., ELEMINOL "JS-20" and "RS-3000" (sodium N-sulfonic acid polyoxyalkylene methacrylates) manufactured by Sanyo Chemical Industries, Ltd., and LATEMUL "PD-104" and "PD-105" (ammonium polyoxyalkylene alkenyl ether sulfonates) manufactured by Kao Corporation.

The content of the monomer other than components (a1) and (a2) is 1 to 98 wt %, preferably 10 to 80 wt %, per 100 wt % of the monomers (a1) to (a3). If this content is less than 1 wt %, there may be a problem that the acrylic resin is difficult to dissolve in water, and if this content is more than 98 wt %, the effect of imparting redispersibility of the dispersion may be impaired.

The monomers as components (a1) to (a3) can be polymerized by a known polymerization method, such as solution polymerization, emulsion polymerization, suspension polymerization or bulk polymerization. Among these known polymerization methods, solution polymerization is preferably applied from the viewpoint of a facility and ease of operations.

For efficiently carrying out the polymerization reaction, a known polymerization initiator can be used. The polymerization initiator can be appropriately selected according to a polymerization method, polymerization conditions, and solubility in a solvent, and the temperature at which the concentration decreases by half in 10 hours is preferably 70 to 110° C. from the viewpoint of safety and polymerization efficiency. If the temperature at which the concentration decreases by half in 10 hours is lower than 70° C., the risk of ignition may increase because stability at room temperature is low. If the temperature at which the concentration decreases by half in 10 hours is 110° C. or higher, the polymerization reaction may require a high temperature and a long time, resulting in deterioration of production efficiency. Specific examples of the polymerization initiator include azobis compounds such as 2,2'-azobis-isobutyronitrile, organic peroxides such as benzoyl peroxide, inorganic peroxides such as sodium persulfate, and redox catalyst systems including a combination of such an oxide and a reducing agent such as a bisulfite, and they can be used alone or in combination of two or more thereof.

A chain transfer agent can be added for adjusting the molecular weight to fall within a preferred range. Examples thereof include alcohols such as catechol, mercaptans such as n-dodecyl mercaptan, and halocarbons such as carbon tetrachloride, and they can be used alone or in combination of two or more thereof. It is preferable to select a mercaptan in view of the chain-transfer constant and safety, and a mercaptan having a high boiling point, such as n-dodecyl mercaptan, is particularly preferable from the viewpoint that the odor of a remaining mercaptan can be suppressed.

Use of a solvent is preferable because the polymer can be handled in a solution state and can be synthesized by a simple apparatus. An appropriate solvent can be selected according to a polymerization method and polymerization conditions that are applied, the solubility of raw materials, and a composition of a solvent for a dispersion composition including a dispersant, and when an aqueous dispersant is produced, it is preferable to select a solvent having a boiling point of 60 to 120° C. under standard conditions. If the boiling point is lower than 60° C., it may be difficult to efficiently carry out polymerization in a short time. On the other hand, if the boiling point is 120° C. or higher, a large amount of energy may be required for distillation under reduced pressure. Examples of the solvent that is preferably used include water (boiling point: 100° C.), alcohols such as 2-propanol (boiling point: 82° C.), esters such as ethyl acetate (boiling point: 77° C.), ketones such as 2-butanone (boiling point: 80° C.), aromatic hydrocarbons such as toluene (boiling point: 111° C.), and ethers such as tetrahydrofuran (boiling point: 66° C.), and these solvents can be used alone or in combination of two or more thereof. When an aqueous dispersant is produced, water-miscible alcohols, ethers, and mixed solvents of the foregoing with other organic solvents and/or water are suitably used, and 2-propanol, and mixed solvents of 2-propanol with other organic solvents and/or water are more suitably used in view of safety and economy.

For stabilizing a state in which the polymer is dissolved or dispersed in a solvent, a neutralizing agent can be used to neutralize a part or all of the functional groups of the polymer. The neutralizing agent may be added to a monomer before polymerization, or may be added after polymerization of a monomer having an acidic functional group. As the neutralizing agent for an acidic functional group, a basic compound can be used, and the neutralizing agent can be appropriately selected in consideration of compatibility with a dispersion system and the composition of a dispersion composition including a dispersant. Specific examples include organic amine compounds such as ammonia and 2-amino-2-methyl-1-propanol, and alkali metal hydroxides such as sodium hydroxide, and organic amine compounds having a high boiling point, such as 2-amino-2-methyl-1-propanol are suitably used from the viewpoint of safety and the odor.

The (A) styrene-ethyleneoxy group-containing (meth) acrylic acid-based copolymer obtained by the polymerization method has a weight average molecular weight (Mw) of 1,000 to 50,000, preferably 3,000 to 30,000. A weight average molecular weight (Mw) of less than 1,000 is not preferable because the ability to stabilize the dispersion of disperse dyes and pigments decreases, and a weight average molecular weight of more than 50,000 is not preferable because the ability to disperse disperse dyes and pigments decreases, and the viscosity of ink may become excessively high. The weight average molecular weight can be measured by a gel permeation chromatography (GPC) method.

The acid value of the (A) styrene-ethyleneoxy group-containing (meth)acrylic acid-based copolymer is in the range of preferably 50 to 300, more preferably 100 to 250. An acid value of less than 50 is not preferable because the solubility of the resin in water is deteriorated, and there tends to be poor ability to stabilize the dispersion of disperse dyes and pigments, and an acid value of more than 300 is not preferable because affinity to an aqueous medium increases, so that an image after printing tends to be easily blurred. The acid value of the resin represents an amount in mg of KOH required to neutralize 1 g of the resin, and is, measured in accordance with JIS-K 3054.

The content of the (A) styrene-ethyleneoxy group-containing (meth)acrylic acid-based copolymer in the dispersant is 50 to 99 wt %, preferably 60 to 99 wt %, more preferably 70 to 99 wt %. If the content is less than 50 wt %, there is a problem that the dispersibility of disperse dyes and pigments is deteriorated, and if the content is more than 99 wt %, there is a possibility that wettability to disperse dyes and pigments is deteriorated, and impartment of redispersibility is hindered.

The acetylene glycol as component (B) has the formula (1).

(1)

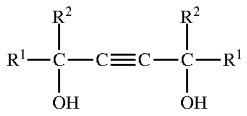

In formula (1), $R^1$ and $R^2$ each represent an alkyl group having 3 to 5 carbon atoms.

Examples of the acetylene glycol having the formula (1) include 2,5,8,11-tetramethyl-6-dodecyne-5,8-diol, 5,8-dimethyl-6-dodecyne-5,8-diol, 2,4,7,9-tetramethyl-5-decyne-4,7-diol, and 4,7-dimethyl-5-decyne-4,7-diol.

The ethoxylated substance of acetylene glycol has the formula (2).

(2)

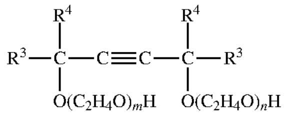

In the formula (2), $R^3$ and $R^4$ each represent an alkyl group having 1 to 5 carbon atoms, each of m and n is a positive number of 0.5 to 25, and m+n is 1 to 40.

Examples of the ethoxylated substance of acetylene glycol of the formula (2) include ethylene oxide derivatives of the acetylene glycol such as ethoxylated substances of 2,5,8,11-tetramethyl-6-dodecyne-5,8-diol (average value of m+n: 6), ethoxylated substances of 2,4,7,9-tetramethyl-5-decyne-4,7-diol (average value of m+n: 10), ethoxylated substances of 2,4,7,9-tetramethyl-5-decyne-4,7-diol (average value of m+n: 4), and ethoxylated substances of 3,6-dimethyl-4-octyne-3,6-diol (average value of m+n: 4). The number of moles of ethylene oxide units added in the formula (2) is preferably 0.5 to 25, and the total number of moles of the units added is preferably 1 to 40. If the total number of moles of ethylene oxide added is more than 40, solubility in water increases, so that the foaming property becomes high, resulting in deterioration of the defoaming effect.

The weight average molecular weight of acetylene glycol as component (B) is preferably 1,000 or less.

HLB of the acetylene glycol as component (B) is not particularly limited, and is preferably 2 to 15, more preferably 2 to 14, still more preferably 2 to 12. Here, HLB (Hydrophile-Lipophile Balance) is defined by the following equation (3) (Griffin method). The value of HLB runs a from 0 through 20. A value closer to 0 indicates being more lipophilic, and a value closer to 20 indicates being more hydrophilic.

$$HLB = 20 \times \frac{\text{molecular weight of hydrophilic portion}}{\text{molecular weight of whole molecule}}$$

The acetylene glycols as component (B) may be used alone or used in admixture of two or more thereof. The compounding amount of component (B) is required to be 1 to 50 wt %, and is preferably 1 to 40 wt %, more preferably 1 to 30 wt %, of the total amount of the dispersant. If the compounding amount of component (B) is less than 1 wt %, wettability to disperse dyes and pigments may be deteriorated, and if the compounding amount is more than 50 wt %, the dispersibility of disperse dyes and pigments may be aggravated.

The dispersant of the present invention can be obtained by mixing component (A) and component (B) by a known mixing and preparation method using a propeller-type stirrer or the like. Here, when a solid component is used at room temperature, mixing under heating may be performed if necessary.

The dispersion of the present invention contains the dispersant, a disperse dye and/or pigment, and an aqueous solvent.

The constituent components of the dispersion will be described below.

In the dispersion of the present invention, the compounding amount of the dispersant is preferably 1 to 100 parts by weight, more preferably 3 to 80 parts by weight, still more preferably 5 to 50 parts by weight per 100 parts by weight of the disperse dye and pigment. An excessively small compounding amount of the dispersant is not preferable because the disperse dye and pigment cannot be sufficiently dispersed, and an excessively large amount of the dispersant is not preferable because a large amount of the dispersant that is not adsorbed to the disperse dye or pigment is present in the dispersion.

The disperse dye is not particularly limited, and a known disperse dye can be used. The disperse dyes are classified into benzene azo (monoazo and disazo), heterocyclic azo (thiazole azo, benzothiazole azo, pyridone azo, pyrazolone azo, thiophene azo, etc.), anthraquinone, and condensed (quinophthalone, styryl, coumarin, etc.) chemical structures and characterized in that they are substantially insoluble in water due to the lack of water-soluble groups and have a smaller molecular weight of up to 2,000 than other dyes.

Examples of the disperse dye which can be preferably used in the present invention are shown below:

yellow dyes such as C. I. Disperse Yellow 3, 4, 5, 7, 9, 13, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 114, 116, 118, 119, 122, 124, 126, 135, 140, 141, 149, 160, 162, 163, 164, 165, 179, 180, 182, 183, 186, 192, 198, 199, 202, 204, 210, 211, 215, 216, 218 and 224;

orange dyes such as C. I. Disperse Orange 1, 3, 5, 7, 11, 13, 17, 20, 21, 25, 29, 30, 31, 32, 33, 37, 38, 42, 43, 44, 45, 47, 48, 49, 50, 53, 54, 55, 56, 57, 58, 59, 61, 66, 71, 73, 76, 78, 80, 89, 90, 91, 93, 96, 97, 119, 127, 130, 139 and 142;

red dyes such as C. I. Disperse Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 289, 298, 302, 303, 310, 311, 312, 320, 324 and 328:

violet dyes such as C. I. Disperse Violet 1, 4, 8, 23, 26, 27, 28, 31, 33, 35, 36, 38, 40, 43, 46, 48, 50, 51, 52, 56, 57, 59, 61, 63, 69 and 77;

green dyes such as C. I. Disperse Green 6:1, 9;

brown dyes such as C. I. Disperse Brown 1, 2, 4, 9, 13, 19, 21 and 27;

blue dyes such as C. I. Disperse Blue 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330, 333, 359 and 360; and black dyes such as C. I. Disperse Black 1, 3, 10 and 24.

Examples of the dye manufactured by Nippon Kayaku Co., Ltd., which can be preferably used, include Kayaset Black K-R, A-N, Kayalon Polyester Black S-200, EX-SF 300, G-SF, BR-SF, 2B-SF 200, TA-SF 200, AUL-S, Kayaset Yellow K-CL, Kayalon Polyester Yellow 4G-E, Kayalon Polyester Light Yellow 5G-S, Kayaset Red K-BL, Kayacelon Red E-BF, SMS-5, SMS-12, Kayalon Polyester Red TL-SF, BR-S, BL-E, HL-SF, 3BL-S200, AUL-S, Kayalon Polyester Light Red B-S200, Kayalon Polyester Rubin BL-S200, Kayaset Blue N, K-FL, MSB-13, Kayalon Polyester Blue BR-SF, T-S, Kayalon Polyester Light Blue BGL-S200, Kayalon Polyester Turq Blue GL-S200, and Kayalon Polyester Blue Green FCT-S.

Examples of the dye manufactured by Orient Chemical Industries Co., Ltd., which can be preferably used, include Valifast Black 3806, 3810, 3820, Oil Black BS, BY, B-85, 860, Water Yellow 6C, Valifast Yellow 1101, 1105, 3110, 3120, 4120, 4126, Oplas Yellow 130, 140, Oil Yellow GG-S, 105, 107, 129, 818, Water Red 27, Valifast Red 1306, 1355, 2303, 3311, 3320, Valifast, Orange 3210, Valifast Brown 2402, Oil Red 5B, Oil Pink 312, Oil Brown BB, Valifast Blue 1601, 1603, 1605, 2606, 3806, 3820, Oil Blue #15, #613, 613, N14, and BOS.

Examples of the dye manufactured by Sumitomo Chemical Co., Ltd., which can be preferably used, include Sumikaron Black S-BL, S-BF extra conc., S-RPD, S-XE 300%, Sumikaron Yellow SE-4G, SE-5G, SE-3GL conc., SE-RPD, Sumikaron Brilliant Flavine S-10G, Sumikaron Red E-FBL, E-RPD(E), S-RPD(S), Sumikaron Brilliant Red S-BF, S-BLF, SE-BL, SE-BGL, SE-2BF, SE-3BL(N), Sumikaron Red E-FBL, E-RPD(E), S-RPD(S), Sumikaron Brilliant Red S-BF, S-BLF, SE-BL, SE-BGL, SE-2BF, SE-3BL(N), Sumikaron Brilliant Blue S-BL, Sumikaron Turquoise Blue S-GL, and S-GLFgrain.

Examples of the dye manufactured by BASF, which can be preferably used, include Basacryl Black X-BGW, NaozaponBlack X-51, X-55, Neozapon Yellow 081, Lurafix Yellow 138, etc., Zapon Blue 807, Neozapon Blue 807, Lurafix Blue590, 660, Orasol Black RLI, RL, CN, Oracet Yellow 8GF, GHS, Orasol Red G, Oracet Pink RP, Orasol Blue GL, GN, and 2R.

Examples of the dye manufactured by Taoka Chemical Industry Co., Ltd., which can be preferably used, include Oleosol Fast Black AR, RL, Oleosol Fast Pink FB, Rhodamine A, B, B gran., Oleosol Fast Yellow 2G, and Oleosol Fast Blue ELN.

Examples of the dye manufactured by HODOGAYA CHEMICAL CO., LTD., which can be preferably used, include Spilon Black BNH, and MR special.

Examples of the dye manufactured by Mitsui Chemical Co., Ltd., which can be preferably used, include PS Yellow GG, MS Yellow HD-180, PS Red G, and MS Magenta VP.

Examples of the dye manufactured by Bayer AG, which can be preferably used, include Ceres Blue GN 01.

Examples of the dye manufactured by Sumika Color Co., Ltd., which can be preferably used, include TS Yellow 118 cake, ESC Yellow 155, Sumiplast Yellow HLR, GC, TS Turq Blue 618, 606, ESC Blue 655, 660, Sumiplast BlueS, and OA.

The pigment is not particularly limited, and a known pigment can be used. Examples of the organic pigment include azo pigments such as soluble azo pigments, insoluble azo pigments, condensed azo pigments; polycyclic pigments such as quinacridone pigments, perylene pigments, perinone pigments, isoindolinone pigments, isoindoline pigments, dioxazine pigments, thioindigo pigments, anthraquinone pigments, quinophthalone pigments, metal complex pigments, diketo-pyrrolo-pyrrole pigments; and phthalocyanine pigments. Examples of the inorganic pigment include carbon black, metal oxides, metal hydroxides, metal sulfides, metal phthalocyanides, and metal chlorides. Examples of the carbon black include furnace black, lamp black, acetylene black, and channel black.

Specific examples of the pigment include red pigments such as C. I. Pigment Red 7, 9, 14, 41, 48:1, 48:2, 48:3, 48:4, 81:1, 81:2, 81:3, 122, 123, 146, 149, 168, 177, 178, 179, 187, 200, 202, 208, 210, 215, 224, 254, 255 and 264;

yellow pigments such as C. I. Pigment Yellow 1, 3, 5, 6, 14, 55, 60, 61, 62, 63, 65, 73, 74, 77, 81, 93, 97, 98, 104, 108, 110, 128, 138, 139, 147, 150, 151, 154, 155, 166, 167, 168, 170, 180, 188, 193, 194 and 213;

orange pigments such as C. I. Pigment Orange 36, 38 and 43;

blue pigments such as C. I. Pigment Blue 15, 15:2, 15:3, 15:4, 15:6, 16, 22 and 60;

green pigments such as C. I. Pigment Green 7, 36 and 58;

violet pigments such as C. I. Pigment Violet 19, 23, 32 and 50; and black pigments such as C. I. Pigment Black 7.

Among them, C. I. Pigment Red 122, C. I. Pigment Yellow 74, 128, and 155, C. I. Pigment Blue 15:3, 15:4, and 15:6, C. I. Pigment Green 7 and 36, C. I. Pigment Violet 19, C. I. Pigment Black 7, and the like can be preferably used.

The type, particle size and treatment of the disperse dye and/or pigment in the dispersion may be selected as appropriate depending on a particular purpose. The disperse dye and/or pigment in the dispersion may be used alone or in admixture of two or more.

The concentration of the disperse dye and pigment in the dispersion is preferably 1 to 50 wt %, more preferably 5 to 50 wt % per 100 wt % of the dispersion. If the concentration of the disperse dye and pigment is more than 50 wt %, the density of the disperse dye and pigment may increase in the dispersion, resulting in occurrence of aggregation due to hindrance to free movement.

As the aqueous solvent, water and/or water-soluble organic solvents may be used, optionally in admixture of two or more. Water is preferably pure water or deionized (ion exchanged) water. Suitable water-soluble organic solvents include alcohols such as methyl alcohol, ethyl alcohol, n-propyl alcohol, isopropyl alcohol, n-butyl alcohol, sec butyl alcohol, and tert-butyl alcohol; glycols such as ethylene glycol, propylene glycol, dipropylene glycol, butylene glycol, triethylene glycol, 1,2,6-hexanetriol, thiodiglycol, hexylene glycol, and diethylene glycol; glycol ethers such as ethylene glycol monomethyl ether, ethylene glycol monoethyl ether, diethylene glycol methyl ether, diethylene glycol ethyl ether, triethylene glycol monomethyl ether, triethylene glycol monoethyl ether, and triethylene glycol monobutyl ether; polyhydric alcohols such as glycerin; and nitrogen containing compounds such as N-methyl-2-pyrrolidone, 2-pyrrolidone, and 1,3-dimethyl-2-imidazolidinone. The proportion of the water and water-soluble organic solvent in the dispersion is preferably 5 to 95 wt %, more preferably 30 to 90 wt % based on 100 wt % of the dispersion.

It is preferable that the method for producing a dispersion according to the present invention includes the step of mixing and dispersing the dispersant, a disperse dye and/or pigment, and an aqueous solvent. The dispersion can be obtained by, for example, mixing a dispersant, a disperse dye and/or pigment and an aqueous solvent using a mixing and dispersing machine such as a paint shaker, a bead mill, a ball mill, a dissolver, or a kneader. When a solid component is used at room temperature, mixing under heating may be performed if necessary.

The static surface tension of the dispersion is preferably 60 mN/m or less, more preferably 40 mN/m or less.

The viscosity of the dispersion is preferably 50.0 mPa·s or less, more preferably 30.0 mPa·s or less. The lower limit of the viscosity of the dispersion is preferably 1.0 mPa·s or more. The viscosity is measured at 25° C.

The mean particle size of the disperse dye and/or pigment in the dispersion depends on the type of disperse dye and/or pigment, and is preferably 500 nm or less, more preferably 300 nm or less. The mean particle size as used herein refers to a median diameter (D50).

The dispersion of the present invention is excellent in dispersion stability, and its interfacial transport rate is preferably 3.0 μm/s or less.

The dispersion of the present invention is excellent in redispersibility. If ink containing coloring agents insoluble in water like disperse dyes and pigments falls into a dry state, aggregation occurs as the dispersed state of disperse dyes and pigments is no longer maintained. In general, it is often the case that redispersibility is insufficient to the extent that once aggregated, disperse dyes and pigments in the ink cannot be returned to a dispersed state again even by adding a liquid medium such as water, but in the present invention, the redispersibility is improved. In the present invention, the ratio of elution of the dispersion into the dispersion medium is preferably 40% or more, more preferably 50% or more. The ratio of elution of the dispersion into the dispersion medium is described in Examples below.

An ink composition of the present invention contains the dispersion of the present invention, and contains a resin and other additives as necessary. That is, it is preferable that the ink composition of the present invention contains the following components (i) to (v):

(i) the dispersant;
(ii) the disperse dye and/or pigment;
(iii) water and/or a water-soluble organic solvent;
(iv) a resin; and
(v) one or more additives selected from the group of an ultraviolet absorber, an antioxidant, a pH adjuster, an antiseptic agent and a viscosity modifier.

The concentration of the disperse dye and/or pigment in the ink composition is preferably 0.1 to 20 wt %, more preferably 0.1 to 10 wt % per 100 wt % of the ink composition.

The proportion of the water and/or water-soluble organic solvent in the ink composition is preferably 50 to 99 wt %, more preferably 60 to 95 wt % per 100 wt % of the ink composition.

The resin contained in the ink composition is preferably a polymer having a hydrophobic group and a hydrophilic group. It is preferable that the polymer has at least one functional group selected from an alkyl group, a cycloalkyl group and an aryl group as a hydrophobic group. It is preferable that the polymer has at least one functional group selected from a carboxy group, a sulfo group, a hydroxy group, an amino group and an amide group as a hydrophilic group. Such a polymer is obtained by, for example, polymerizing a monomer or oligomer having a functional group such as an acryloyl group, a methacryloyl group, a vinyl group, or an allyl group. Specific examples of the monomer which can be used herein include styrene, tetrahydrofurfuryl acrylate, butyl methacrylate, (α,2, 3 or 4)-alkylstyrene, (α, 2, 3 or 4)-alkoxystyrene, 3,4-dimethylstyrene, α-phenylstyrene, divinylbenzene, vinylnaphthalene, dimethylaminomethyl (meth)acrylate, dimethylaminoethyl (meth)acrylate, dimethylaminopropylacrylamide, N,N-dimethylaminoethyl acrylate, acryloylmorpholine, N,N-dimethylacrylamide, N-isopropylacrylamide N,N-diethylacrylamide, methyl (meth)acrylate, ethyl (meth)acrylate, propyl (meth)acrylate, ethylhexyl (meth)acrylate, other alkyl (meth)acrylates, methoxydiethylene glycol (meth)acrylate, (meth)acrylates of diethylene glycol or polyethylene glycol having an ethoxy, propoxy or butoxy group, cyclohexyl (meth)acrylate, benzyl (meth)acrylate, phenoxyethyl (meth)acrylate, isobornyl (meth)acrylate, hydroxyalkyl (meth)acrylates, fluorine, chlorine or silicon containing (meth)acrylates, (meth)acrylamide, and maleic acid amide. When a cross-linking structure is introduced in addition to a monofunctional monomer such as (meth)acrylic acid, compounds having an acryloyl or methacryloyl group can be used, for example, (meth)acrylates such as (mono, di, tri, tetra or poly)-ethylene glycol di(meth)acrylate, (meth)acrylates of 1,4-butanediol, 1,5-pentanediol, 1,6-hexanediol, 1,8 octanediol, and 1,10-decanediol, trimethylolpropane tri(meth)acrylate, glycerin (di or tri)-(meth)acrylate, di(meth)acrylates of ethylene oxide adducts of bisphenol A or F, neopentylglycol di(meth)acrylate, pentaerythritol tetra(meth)acrylate, and dipentaerythritol hexa(meth)acrylate.

The proportion of the resin in the ink composition is not particularly limited, and is preferably 0 to 30 wt %, more preferably 0 to 20 wt % per 100 wt % of the ink composition. When a resin is blended in the ink composition, the content of the resin is preferably 1 wt % or more.

The ink composition may contain various other additives. Examples of the additive include an ultraviolet absorber, antioxidant, pH adjuster, antiseptic agent, and viscosity modifier, and any of these additives may be appropriately selected, and blended in the ink composition. The amount of these additives blended is the balance of 100 wt % of the dispersion or ink composition, left after removal of the disperse dye and/or pigment, water and/or water-soluble organic solvent and resin, specifically 0 to 10 wt % per 100 wt % of the ink composition.

The method for producing an ink composition is not particularly limited, and it is preferable to employ a method including the steps (a) and (b):

(a) mixing and dispersing the dispersant, a disperse dye and/or pigment, and an aqueous solvent to obtain a dispersion; and (b) mixing the dispersion with at least one substance selected from the group consisting of water, a water-soluble organic solvent, a resin, an ultraviolet absorber, an antioxidant, a pH adjuster, an antiseptic agent, and a viscosity modifier.

The ink composition is applied onto a recording medium by an ink jet recording system, a recording system using a writing tool such as a pen, or a printing system. The ink composition is preferably used in the ink jet recording system.

EXAMPLES (A) A styrene-ethyleneoxy group-containing (meth) acrylic acid-based copolymer was synthesized by a known conventional method as described below. In Production Examples, the "part" means a "part by weight" and "%" means "wt %" unless otherwise specified.

Production Example 1

Synthesis of Copolymer of Styrene at 20%, Methyl Methacrylate at 27%, Polyethylene Glycol Methacrylate at 20% and Methacrylic Acid at 33%

(Solution Polymerization Step)

A three-necked flask equipped with a thermometer, a stirrer and a reflux tube was charged with 18 parts of styrene (hereinafter referred to as ST), 24 parts of methyl methacrylate (hereinafter referred to as MMA), 18 parts of polyethylene glycol methacrylate (average number of moles of EO added: 23; "BLEMMER PME-1000" manufactured by NOF CORPORATION; hereinafter referred to as "PEG(23) MA"), 30 parts of methacrylic acid (hereinafter referred to as "MAA"), 1.8 parts of n-dodecyl mercaptan (hereinafter referred to as "NDM") as a chain transfer agent, 0.9 parts of 2,2'-azobis-isobutyronitrile (hereinafter referred to as "AIBN") as a polymerization initiator, and 92.7 parts of 2-propanol (hereinafter referred to as "IPA") as a solvent, and the operation of deoxygenation and nitrogen pursing was then repeated twice to fill the inside of the flask with nitrogen. Thereafter, stirring was started, and heating was performed until the internal temperature reached 80° C. Stirring was continued for 6 hours while an internal temperature of 80° C. was maintained. After 6 hours, 123.3 parts of IPA was slowly added, and the internal temperature was then decreased to 25° C. or lower to obtain a non-neutralized styrene-methacrylic acid-based copolymer (IPA solution). The drying residue content of the obtained copolymer solution was 30.4%. The non-neutralized styrene-methacrylic acid-based copolymer had a weight average molecular weight of 18,275 and a numerical average molecular weight of 6,991.

In the present invention, the values of the weight average molecular weight and the numerical average molecular weight are obtained by drying a non-neutralized polymer solution at 105° C. for 3 hours, then dissolving the drying residue in tetrahydrofuran to a polymer content of 1%, then filtering the solution through a membrane filter with a pore size of 0.45 μm, subjecting the filtrate to gel permeation chromatography (GPC) measurement under the following conditions, and calculating the molecular weights in terms of standard polystyrene.

Column: Shodex KF-802 and Shodex KF 806M (manufactured by Showa Denko K. K.)
Elution solvent: tetrahydrofuran
Flow rate: 1.0 mL/min
Injection amount: 10 μL,
Column temperature: 40° C.
Detector: RI detector (Aqueous Solution Forming Step)

150 parts of the obtained non-neutralized styrene-methacrylic acid-based copolymer (IPA solution) was weighed and taken in a beaker, 12.5 parts of 25% aqueous ammonia and 150 parts of ion-exchange water were then added with stirring to neutralize the polymer, and the solution was then transferred to an eggplant flask. 85 parts of the solution was distilled off using a rotary evaporator, 285 parts of ion-exchange water was then added, and 320 parts of the solution was distilled off under reduced pressure to remove IPA from the solution. Using 25% aqueous ammonia and ion-exchange water, the pH and the drying residue content are adjusted to 9 and about 20%, respectively, to obtain a styrene-methacrylic acid-based copolymer neutralized with ammonia (aqueous solution).

Production Examples 2 to 7 and 9 and Comparative Production Examples 1 and 2

Synthesis was performed in the same manner as described above except that the contents (charge ratios) of the components were changed as in Table 1.

Hereinafter and in Table 1, polyethylene glycol methacrylate (average number of moles of EO added: 9, "BLEMMER PME-400" manufactured by NOF CORPORATION) is written as "PEG (9)MA";

polyethylene glycol methacrylate (average number of moles of EO added: 90, "BLEMMER PME-4000" manufactured by NOF CORPORATION) is written as "PEG(90)MA";

2-sodium sulfoethylmethacrylate ("Anton MS-2N-D" manufactured by Nippon Nyukazai Co., Ltd., effective content: 88%) is written as "NaSEMA"; and 2-hydroxyethyl methacrylate is written as "HEMA".

Production Example 8

Synthesis of Copolymer of ST at 20%, MMA at 27%, PEG(23)MA at 20%, MAA at 23% and NaSEMA at 10%

(Solution Polymerization Step)

A three-necked flask equipped with a thermometer, a stirrer and a reflux tube was Charged with 18 parts of ST, 24 parts of MMA, 18 parts of PEG(23)MA, 21 parts of MAA, 10.2 parts of NaSEMA, 1.8 parts of NDM, 0.9 parts of AIBN, 64.8 parts of IPA and 27.9 parts of ion-exchange water, and the operation of deoxygenation and nitrogen pursing was then repeated twice to fill the inside of the flask with nitrogen. Thereafter, stirring was started to dissolve NaSEMA and AIBN, and heating was performed until the internal temperature reached 80° C. Stirring was continued for 6 hours while an internal temperature of 80° C. was maintained. After 6 hours, 276.9 parts of ion-exchange water was slowly added, and the internal temperature was then decreased to 25° C. or lower to obtain styrene-methacrylic acid-based copolymer remaining non-neutralized at carboxylic acid (IPA-water mixed solvent solution). The drying residue content of the obtained copolymer solution was 20.5%. The non-neutralized styrene-methacrylic acid-based copolymer remaining non-neutralized at carboxylic acid had a weight average molecular weight of 6,204 and a numerical average molecular weight of 3,997.

(Aqueous Solution Forming Step)

250 parts of the obtained styrene-methacrylic acid-based copolymer remaining non-neutralized at carboxylic acid (IPA/water Mixed solvent Solution) was transferred to an eggplant flask, and 53 parts of the solution was then distilled off using a rotary evaporator. 130 parts of ion-exchange water was added, and 156 parts of the solution was distilled off under reduced pressure to remove IPA from the solution. Using 25% aqueous ammonia and ion-exchange water, the pH and the drying residue content are adjusted to 9 and about 20%, respectively, to obtain a styrene-methacrylic acid-based copolymer neutralized at carboxylic acid with ammonia (aqueous solution).

Production Example 10

Synthesis of Copolymer of ST at 30%, MMA at 17%, PEG(23)MA at 20% and MAA at 33%

(Solution Polymerization Step)

A three-necked flask equipped with a thermometer, a stirrer and a reflux tube was charged with 27 parts of ST, 15 parts of MMA, 18 parts of PEG(23)MA, 30 parts of MAA, 1.8 parts of NDM, 0.9 parts of AIBN, 92.7 and parts of IPA, and the operation of deoxygenation and nitrogen pursing was then repeated twice to fill the inside of the flask with nitrogen. Thereafter, stirring was started to dissolve AIBN, and heating was performed until the internal temperature readied 80° C. Stirring was continued for 6 hours while an internal temperature of 80° C. was maintained. After 6 hours, 123.3 parts of IPA was slowly added, and the internal temperature was then decreased to 25° C. or lower to obtain styrene-methacrylic acid-based copolymer remaining non-neutralized at carboxylic acid (IPA solution). The drying residue content of the obtained copolymer solution was 30.5%. The non-neutralized styrene-methacrylic acid-based copolymer remaining non-neutralized at carboxylic acid had a weight average molecular weight of 16,477 and a numerical average molecular weight of 6,058.

(Aqueous Solution Forming Step)

150 parts of the obtained non-neutralized styrene-methacrylic acid-based copolymer (IPA solution) was weighed and taken in a beaker, 110.3 parts of 5% NaOH and 45.2 parts of ion-exchange water were then added with stirring to neutralize the polymer, and the solution was then transferred to an eggplant flask. 85 parts of the solution was distilled off using a rotary evaporator, 285 parts of ion-exchange water was then added, and 320 parts of the solution was distilled off under reduced pressure to remove IPA from the solution. Using 5% NaOH and ion-exchange water, the pH and the drying residue content are adjusted to 7 and about 16%, respectively, to obtain a styrene-methacrylic acid-based copolymer neutralized at carboxylic acid with NaOH (aqueous solution).

TABLE 1

| | | | Production Example | | | | | | |
|---|---|---|---|---|---|---|---|---|---|
| Content of component (%) | | | 1 | 2 | 3 | 4 | 5 | 6 | 7 |
| (A) | (a1) | ST | 20 | 20 | 20 | 20 | 20 | 20 | 20 |
| | (a2) | PEG(9)MA | | 20 | | | | | |
| | | PEG(23)MA | 20 | | | 10 | 40 | 47 | 20 |
| | | PEG(90)MA | | | 20 | | | | |
| | (a3) | MMA | 27 | 27 | 27 | 37 | 7 | | 17 |
| | | MAA | 33 | 33 | 33 | 33 | 33 | 33 | 33 |
| | | NaSEMA | | | | | | | |
| | | HEMA | | | | | | | 10 |
| | Acid value (mgKOH/g) | | 211 | 211 | 211 | 211 | 211 | 211 | 211 |

TABLE 1-continued

| | | | | | | | |
|---|---|---|---|---|---|---|---|
| Weight average molecular weight (Mw) | 18,275 | 17,157 | 23,653 | 20,035 | 21,594 | 21,980 | 18,100 |
| Drying residue content (%) | 20.9 | 18.8 | 18.3 | 19.5 | 19.3 | 20.7 | 22.3 |

| | | | Production Example | | | Comparative Production Example | |
|---|---|---|---|---|---|---|---|
| Content of component (%) | | | 8 | 9 | 10 | 1 | 2 |
| (A) | (a1) | ST | 20 | 10 | 30 | 20 | 80 |
| | (a2) | PEG(9)MA | | | | | |
| | | PEG(23)MA | 20 | 20 | 20 | | 20 |
| | | PEG(90)MA | | | | | |
| | (a3) | MMA | 27 | 37 | 17 | 47 | |
| | | MAA | 23 | 33 | 33 | 33 | |
| | | NaSEMA | 10 | | | | |
| | | HEMA | | | | | |
| Acid value (mgKOH/g) | | | 171 | 211 | 211 | 211 | 0 |
| Weight average molecular weight (Mw) | | | 6,204 | 15,906 | 16,477 | 12,211 | Aqueous solution |
| Drying residue content (%) | | | 21.3 | 22.5 | 16.1 | 19.7 | not formed |

Examples and Comparative Examples are given below to more concretely illustrate the present invention, although the present invention is not limited by these Examples. In the following Examples, the part and % represent the part by weight and wt %, respectively.

Example 1

99.0 parts of Production Example 1 (aqueous solution of component (A) at 20.9%) and 1.0 parts of compound (B-1) were stirred to prepare a dispersant.

15 parts of Hostaperm Blue BT-617-D (Pigment Blue 15:4 manufactured by Clariant AG) as a blue pigment, 64.3 parts of ion-exchange water as an aqueous solvent, 20.7 parts of the dispersant, and 300 parts of zirconia beads (diameter: 0.3 mm) were put in a plastic container (made of polypropylene, capacity: 0.5 L), and dispersed for 1 hour using PAINT SHAKER (manufactured by Asada Iron Works Co., Ltd.). After the dispersion, the zirconia beads were separated by filtration to obtain a dispersion.

Examples 2 to 14 and Comparative Examples 1 to 12

Dispersions of examples with the compositions shown in Table 2 (Examples) and Table 3 (Comparative Example) below were prepared in the same manner as in Example 1.

The details of components (B) shown in Tables 2 and 3 below are as follows.

(B-1): Ethoxylated substance of 2,5,8,11-tetramethyl-6-dodecyne-5,8-diol (the average value of m+n in formula (2) is 4) (molecular weight: 430, HLB: 8.2)

(B-2): 2,5,8,11-Tetramethyl-6-dodecyne-5,8-diol (molecular weight: 254, HLB: 2.7)

(B-3): Ethoxylated substance of 2,4,7,9-tetramethyl-5-decyne-4,7-diol (the average value of m+n in formula (2) is 4) (molecular weight: 402, HLB: 8.8)

(B-4): Ethoxylated substance of 2,4,7,9-tetramethyl-5-decyne-4,7-diol (the average value of m+n in formula (2) is 10) (molecular weight: 666, HLB: 13.2)

The surface tension, viscosity, mean particle size, dispersion stability, redispersibility (visual observation), and redispersibility/elution ratio of each dispersion were measured by the following methods. The results are shown in Tables 2 and 3.

<Surface Tension>

The static surface tension of the dispersion immediately after dispersion was measured at 25'C using DY-500 Accurate Surface Tensiometer (manufactured by Kyowa Interface Science Co., Ltd.).

<Viscosity>

The viscosity (25° C.) of the dispersion immediately after dispersion was measured using TVE-20 E-type Viscometer (manufactured by TOKISANGYO).

<Mean Particle Size>

The mean particle size (D50) of the dispersion immediately after dispersion was measured using Zeta-potential & Particle size Analyzer ELSZ-2000 (manufactured by Otsuka. Electronics Co., Ltd).

<Dispersion Stability>

The dispersion stability was evaluated using Dispersion Stability Analyzer LUMiSizer (manufactured by LUM Company). The analysis was performed under conditions of a temperature of 25° C. immediately after dispersion, a rotation speed of 4,000 rpm, and an analysis time of 50 minutes to measure an interfacial transport rate (sedimentation rate of particles). The smaller the interfacial transport rate, the better the dispersion stability.

<Redispersibility (Visual Observation)>

100 μL of the dispersion immediately after dispersion is weighed and taken on a petri dish with a micropipette, and left standing at room temperature (about 25° C.) for about 15 hours to be dried. After the drying, 3 mL of ion-exchange water was added, and a state was visually evaluated in which the dried dispersion was redispersed in ion-exchange water. Evaluation criteria for redispersibility are shown below.

Evaluation Criteria

◎: The dried material disappeared, showing that it was redispersed.

○: A part of the dried material remained, but most of the dried material was redispersed.

Δ: Most of the dried material remained, and a part of the dried material was redispersed.

X: Redispersion of the dried material was not observed.

<Redispersibility: Elution Ratio>

100 μL of the dispersion immediately after dispersion is weighed and taken on a petri dish with a micropipette, and left standing at room temperature (about 25° C.) for about 15 hours to be dried. After the drying, the weight of the dried dispersion (weight before redispersion) is measured with an electronic balance, 3 mL of ion-exchange water is then added, and the mixture is left standing for 3 minutes at room temperature (about 25° C.). After the mixture is left standing, the undissolved material is removed with an 80-mesh filter cloth, and the obtained filtrate is dried by a dryer at 60° C. for 3 hours. The dried material (redispersion weight) returned to room temperature after the drying was measured with an electronic balance, and the ratio of elution of the dispersion in ion-exchange water was calculated from the following equation [1].

Redispersibility:

$$\text{Elution ratio}[\%]=(\text{redispersion weight})/(\text{weight before redispersion})\times 100 \quad [1]$$

TABLE 2

| | | | Example | | | | | | | | | | | | | |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| Compositional ratio (wt %) | | (A) | 95.4 | 98.6 | 95.4 | 95.4 | 87.1 | 94.9 | 94.8 | 95.1 | 95.0 | 95.3 | 95.9 | 95.7 | 95.7 | 95.5 |
| | | (B) | 4.6 | 1.4 | 4.6 | 4.6 | 12.9 | 5.1 | 5.2 | 4.9 | 5.0 | 4.7 | 4.1 | 4.3 | 4.3 | 4.5 |
| Dispersant, compositional ratio, total (%) | | | 100 | 100 | 100 | 100 | 100 | 100 | 100 | 100 | 100 | 100 | 100 | 100 | 100 | 100 |
| Compounding ratio of dispersion (parts by weight) | (A) | Production Example 1 | 4.3 | 4.3 | 4.3 | 4.3 | 4.0 | | | | | | | | | |
| | | Production Example 2 | | | | | | 4.3 | | | | | | | | |
| | | Production Example 3 | | | | | | | 4.3 | | | | | | | |
| | | Production Example 4 | | | | | | | | 4.3 | | | | | | |
| | | Production Example 5 | | | | | | | | | 4.3 | | | | | |
| | | Production Example 6 | | | | | | | | | | 4.3 | | | | |
| | | Production Example 7 | | | | | | | | | | | 4.3 | | | |
| | | Production Example 8 | | | | | | | | | | | | 4.3 | | |
| | | Production Example 9 | | | | | | | | | | | | | 4.3 | |
| | | Production Example 10 | | | | | | | | | | | | | | 4.3 |
| | (B) | B-1 | 0.2 | | | | 0.6 | 0.2 | 0.2 | 0.2 | 0.2 | 0.2 | 0.2 | 0.2 | 0.2 | 0.2 |
| | | B-2 | | 0.1 | | | | | | | | | | | | |
| | | B-3 | | | 0.2 | | | | | | | | | | | |
| | | B-4 | | | | 0.2 | | | | | | | | | | |
| | Solvent | DPG | | 0.2 | | | | | | | | | | | | |
| | | pure water | 80.5 | 80.4 | 80.5 | 80.5 | 80.4 | 80.5 | 80.5 | 80.5 | 80.5 | 80.5 | 80.5 | 80.5 | 80.5 | 80.5 |
| | Pigment | BT-617-D | 15.0 | 15.0 | 15.0 | 15.0 | 15.0 | 15.0 | 15.0 | 15.0 | 15.0 | 15.0 | 15.0 | 15.0 | 15.0 | 15.0 |
| Evaluation | Viscosity (mPa · s) | | 11.5 | 11.9 | 12.2 | 12.6 | 13.2 | 11.7 | 14.9 | 11.9 | 13.9 | 14.0 | 12.8 | 10.0 | 13.2 | 5.0 |
| | Surface tension (mN/mn) | | 33.8 | 35.0 | 35.5 | 38.0 | 28.8 | 33.4 | 33.9 | 34.2 | 32.6 | 33.6 | 33.8 | 33.4 | 34.1 | 33.5 |
| | Mean particle size (nm) | | 144 | 131 | 130 | 125 | 187 | 155 | 124 | 150 | 146 | 152 | 145 | 149 | 143 | 144 |
| | Dispersion stability (interfacial transport rate) (μm/s) | | 0.5 | 0.2 | 0.3 | 0.2 | 0.4 | 0.3 | 0.2 | 0.4 | 0.2 | 0.3 | 0.1 | 0.3 | 0.2 | 0.3 |
| | Redispersibility (visual observation) | | ○ | ○ | ○ | ○ | ◎ | ◎ | ○ | ○ | ◎ | ◎ | ◎ | ○ | ◎ | ○ |
| | Redispersibility elution ratio (%) | | 75 | 66 | 75 | 76 | 84 | 84 | 55 | 64 | 80 | 82 | 89 | 62 | 98 | 58 |

* DPG: Dipropylene glycol

** value rounded to one decimal place is shown for the compounding ratio of the dispersion.

TABLE 3

| | | | Comparative Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Compositional ratio (wt %) | | (A) | 100 | 100 | 100 | 100 | 100 | 100 | 100 | 100 | 100 | 95.1 | 94.8 | 100 |
| | | (B) | | | | | | | | | | 4.9 | 5.2 | |
| Dispersant, compositional ratio, total (%) | | | 100 | 100 | 100 | 100 | 100 | 100 | 100 | 100 | 100 | 100 | 100 | 100 |
| Compounding ratio of dispersion (parts by weight) | (A) | Production Example 1 | 4.5 | | | | | | | | | | | |
| | | Production Example 2 | | 4.5 | | | | | | | | | | |
| | | Production Example 3 | | | 4.5 | | | | | | | | | |
| | | Production Example 4 | | | | 4.5 | | | | | | | | |
| | | Production Example 5 | | | | | 4.5 | | | | | | | |
| | | Production Example 6 | | | | | | 4.5 | | | | | | |
| | | Production Example 7 | | | | | | | 4.5 | | | | | |
| | | Production Example 8 | | | | | | | | 4.5 | | | | |
| | | Production Example 10 | | | | | | | | | | | | 4.5 |
| | | Comparative Production Example 1 | | | | | | | | | 4.5 | 4.3 | | |
| | | Comparative Production Example 2 | | | | | | | | | | | 4.3 | |
| | (B) | B-1 | | | | | | | | | | 0.2 | 0.2 | |
| | | B-2 | | | | | | | | | | | | |
| | | B-3 | | | | | | | | | | | | |
| | | B-4 | | | | | | | | | | | | |
| | Solvent | DPG | | | | | | | | | | | | |
| | | pure water | 80.5 | 80.5 | 80.5 | 80.5 | 80.5 | 80.5 | 80.5 | 80.5 | 80.5 | 80.5 | 80.5 | 80.5 |
| | Pigment | BT-617-D | 15.0 | 15.0 | 15.0 | 15.0 | 15.0 | 15.0 | 15.0 | 15.0 | 15.0 | 15.0 | 15.0 | 15.0 |
| Evaluation | Viscosity (mPa · s) | | 11.1 | 11.2 | 15.1 | 11.5 | 12.2 | 11.3 | 12.4 | 10.8 | 7.1 | 5.9 | Not dispersed | 5.8 |
| | Surface tension (mN/m) | | 40.0 | 39.0 | 40.4 | 40.5 | 39.2 | 39.0 | 40.0 | 40.4 | 40.0 | 34.2 | | 41.0 |
| | Mean particle size (nm) | | 130 | 131 | 120 | 133 | 130 | 115 | 127 | 122 | 141 | 145 | | 180 |
| | Dispersion stability (interfacial transport rate) (μm/s) | | 0.6 | 0.2 | 0.2 | 0.2 | 0.3 | 0.2 | 0.3 | 0.3 | 0.4 | 0.6 | | 0.4 |
| | Redispersibility (visual observation) | | Δ | ○ | Δ | Δ | ○ | ○ | ○ | Δ | X | X | | Δ |
| | Redispersibility elution ratio (%) | | 54 | 62 | 35 | 33 | 63 | 62 | 62 | 41 | 4 | 5 | | 43 |

* DPG: Dipropylene glycol

** value rounded to one decimal place is shown for the compounding ratio of the dispersion.

Japanese Patent Application No. 2022-155738 is incorporated herein by reference. Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A dispersant comprising the components (A) and (B):

(A) 50 to 99 wt % of a styrene-ethyleneoxy group-containing (meth)acrylic acid-based copolymer having a weight average molecular weight of 1,000 to 50,000, the copolymer having a (a1) styrene content of 1 to 40 wt %; and (B) 1 to 50 wt % of an acetylene-based surfactant which is at least one compound selected from acetylene glycol having the formula (1):

(1)

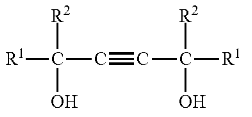

wherein $R^1$ represents an alkyl group having 3 to 5 carbon atoms, and $R^2$ represents an alkyl group having 1 to 5 carbon atoms, and an ethoxylated substance of acetylene glycol having the following formula (2):

(2)

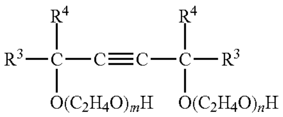

wherein $R^3$ and $R^4$ each represent an alkyl group having 1 to 5 carbon atoms, each of m and n is a positive number of 0.5 to 25, and in m+n is 1 to 40.

2. The dispersant according to claim 1, wherein the component (A) is a polymer of:

(a1) 1 to 40 wt % of styrene;

(a2) 1 to 59 wt % of an ethyleneoxy group-containing (meth)acrylic acid alkyl ester monomer; and (a3) 1 to 98 wt % of a monomer other than (a1) and (a2).

3. The dispersant according to claim 2, wherein the monomer as component (a3) contains a radically polymerizable monomer having at least one functional group.

4. The dispersant according to claim 1, comprising only the components (A) and (B).

5. The dispersant according to claim 1, which is used for dispersing a disperse dye or a pigment in an aqueous solvent.

6. A dispersion comprising a dispersant, a disperse dye and/or pigment, and an aqueous solvent, wherein the dispersant is the dispersant according to claim 1.

7. An ink composition comprising the dispersion according to claim 6.

8. A method for producing a dispersion, comprising the step of mixing and dispersing the dispersant according to claim 1, a disperse dye and/or pigment, and an aqueous solvent.

9. A method for producing an ink composition, comprising the steps (a) and (b):

(a) mixing and dispersing the dispersant according to claim 1, a disperse dye and/or pigment, and an aqueous solvent to obtain a dispersion; and (b) mixing the dispersion with at least one substance selected from the group consisting of water, a water-soluble organic solvent, a resin, an ultraviolet absorber, an antioxidant, a pH adjuster, an antiseptic agent, and a viscosity modifier.

* * * * *